(12) United States Patent
Soon-Shiong

(10) Patent No.: US 12,180,370 B2
(45) Date of Patent: Dec. 31, 2024

(54) ARAGONITE USES

(71) Applicant: Nant Holdings IP, LLC, Culver City, CA (US)

(72) Inventor: Patrick Soon-Shiong, Culver City, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 800 days.

(21) Appl. No.: 17/423,279

(22) PCT Filed: Jan. 14, 2020

(86) PCT No.: PCT/US2020/013562
§ 371 (c)(1),
(2) Date: Jul. 15, 2021

(87) PCT Pub. No.: WO2020/150274
PCT Pub. Date: Jul. 23, 2020

(65) Prior Publication Data
US 2022/0127461 A1    Apr. 28, 2022

Related U.S. Application Data

(60) Provisional application No. 62/874,253, filed on Jul. 15, 2019, provisional application No. 62/867,489, filed on Jun. 27, 2019, provisional application No. 62/792,735, filed on Jan. 15, 2019.

(51) Int. Cl.
| | | |
|---|---|---|
| C08L 95/00 | (2006.01) | |
| B33Y 70/10 | (2020.01) | |
| C08K 3/04 | (2006.01) | |
| C08K 3/26 | (2006.01) | |
| B33Y 80/00 | (2015.01) | |
| B82Y 40/00 | (2011.01) | |

(52) U.S. Cl.
CPC ............... *C08L 95/00* (2013.01); *B33Y 70/10* (2020.01); *C08K 3/042* (2017.05); *C08K 3/26* (2013.01); *B33Y 80/00* (2014.12); *B82Y 40/00* (2013.01); *C08K 2003/265* (2013.01); *C08K 2201/005* (2013.01); *C08K 2201/011* (2013.01)

(58) Field of Classification Search
CPC .......... C08L 95/00; C08K 3/042; C08K 3/26; C08K 2003/265; C08K 2201/005; C08K 2201/011; B33Y 70/10; B33Y 80/00; B82Y 40/00
See application file for complete search history.

(56) References Cited

U.S. PATENT DOCUMENTS

| | | | |
|---|---|---|---|
| 3,951,895 A * | 4/1976 | Anthenien | C08L 33/06 524/561 |
| 5,480,827 A | 1/1996 | Guillemin et al. | |
| 8,945,905 B2 | 2/2015 | Brandt et al. | |
| 9,061,940 B2 | 6/2015 | Chen et al. | |
| 10,457,557 B2 | 10/2019 | Cesareo et al. | |
| 2003/0180208 A1 | 9/2003 | Yaniv | |
| 2006/0156959 A1 | 7/2006 | Engqvist et al. | |
| 2017/0208827 A1 | 7/2017 | Riziq et al. | |
| 2017/0225427 A1 | 8/2017 | Tilton et al. | |
| 2020/0030815 A1 | 1/2020 | Chen | |
| 2020/0230056 A1 | 7/2020 | Fox et al. | |

FOREIGN PATENT DOCUMENTS

| | | | |
|---|---|---|---|
| CN | 104119056 A | 10/2014 | |
| CN | 108249824 A | 7/2018 | |
| CN | 108751874 A * | 11/2018 | ............. C04B 28/04 |
| EP | 1 210 092 A1 | 6/2002 | |
| EP | 1 682 030 B1 | 12/2011 | |
| EP | 2 939 985 A1 | 11/2015 | |
| WO | 01/03709 A1 | 1/2001 | |
| WO | 2009/025653 A1 | 2/2009 | |
| WO | 2010/146574 A1 | 12/2010 | |
| WO | 2011/081681 A1 | 7/2011 | |
| WO | 2016/012583 A1 | 1/2016 | |
| WO | 2016/078971 A1 | 5/2016 | |
| WO | 2017/017281 A1 | 2/2017 | |
| WO | 2019/091915 A1 | 5/2019 | |
| WO | 2020/150274 A1 | 7/2020 | |

OTHER PUBLICATIONS

Bezerra et al. "Production of Filler Aggregate from Waste of Bivalves Molluscs Shells" in Journal of Civil Engineering and Architecture, pp. 363-367, Apr. 2011. (Year: 2011).*
Widyastuti et al. "Synthesis and characterization of CaCO3 (calcite) nano particles from cockle shells (*Anadara granosa* Linn) by precipitation method" in AIP Conf. Proc., 2017. (Year: 2017).*
Marasteanu et al. "Graphene nano-platelet (GNP) reinforced asphalt binders and mixtures" in E&E Congress 2016, 6th Eurasphalt & Eurobitume Congress, 2016. (Year: 2016).*
Ozunlu et al. "A novel approach to light weight and cost effective automotive trim production by integration of graphene from recycled waste tire" from SPE ACCE Conference at Detroit, Michigan, Sep. 2018. (Year: 2018).*
Sinopec Corp. "Products and engineering application of Sinopec's Donghai Asphalt" from Sinopec Corp. website, accessed Jun. 1, 2024, http://www.sinopec.com/listco/en/products_service/asphalt/ (Year: 2024).*

(Continued)

*Primary Examiner* — Alexandra M Moore
(74) *Attorney, Agent, or Firm* — Martin Fessenmaier; Umberg Zipser LLP

(57) ABSTRACT

Compositions, methods, and uses of calcium carbonate-based composition are presented. The calcium carbonate-based composition includes a plurality of restructured calcium carbonate particles that has an average size of equal or less than 10 microns in diameter. Preferably, the calcium carbonate-based composition is generated by unstructuring the aragonite using an acid and a chelator and recrystallizing the unstructured aragonite in a customized form. Exemplary aragonite-based compositions include pavement compositions.

16 Claims, 2 Drawing Sheets

(56) References Cited

OTHER PUBLICATIONS

English machine translation of Jing et al. CN-108751874-A. (Year: 2018).*
International Search Report and Written Opinion received in PCT Application Serial No. PCT/US2020/013562 dated May 7, 2020, 13 pages.
Zhao et al., "Preparation of Calcium Alginate Microgel Beads in an Electrodispersion Reactor Using an Internal Source of Calcium Carbonate Nanoparticles", Langmuir, 2007, vol. 23, pp. 12489-12496.
Walker et al., "Solid-State Transformation of Amorphous Calcium Carbonate to Aragonite Captured by CryoTEM", Angewandte Chemie International Edition, 2017, 7 pages.
Kajiyama et al., "Aragonite nanorods in calcium carbonate/polymer hybrids formed through self-organization processes from amorphous calcium carbonate solution", Small, 2014, vol. 10, No. 8, pp. 1634-1641.
Huang et al., "A carbonate controlled-addition method for amorphous calcium carbonate spheres stabilized by poly (acrylic acid)s", Langmuir, 2007, vol. 23, pp. 12086-12095.
Yang et al., "Poly(acrylic acid)-regulated Synthesis of Rod-Like Calcium Carbonate Nanoparticles for Inducing the Osteogenic Differentiation of MC3T3-E1 Cells", International Journal of Molecular Sciences, 2016, vol. 17, No. 639, pp. 1-11.
Westin et al., "Crystal growth of aragonite and calcite in presence of citric acid, DTPA, EDTA and pyromellitic acid", Journal of Colloid Interface Science, 2005, vol. 282, No. 2, pp. 359-369.
Gong et al., "Learning from nature: constructing high performance graphene-based nanocomposites" Materials Today, 2016, 10 pages.
Vago Razi, "Beyond the skeleton Cnidarian biomaterials as bioactive extracellular microenvironments for tissue engineering", Organogenesis, 2008, vol. 4, No. 1, pp. 18-22.
Boulos et al., "Spinning up the polymorphs of calciumcarbonate", Scientific Report, 2014, vol. 4, No. 3616, pp. 1-6.
Wang et al., "Synthesis of CaCO3/graphene composite crystals for ultra-strong structural materials", The Royal Society of Chemistry, 2012, vol. 2, pp. 2154-2160.
Szunerits et al., "Antibacterial activity of graphene-based materials" Journal of Materials Chemistry Biology, 2016, vol. 4, No. 6892, 38 pages.
"Graphene road paves the way for end of potholes" The Times, 2019, 2 pages.
Kon et al., "Osteochondral regeneration with a novel aragonite-hyaluronate biphasic scaffold: up to 12-month follow-up study in a goat model", Journal of Orthopaedic Surgery and Research, 2015, vol. 10, No. 81, 17 Pages.
Youtube, "Oil clean-up performed by Grafysorber®—Long Version", URL: https://www.youtube.com/watch?v=FDHtPiiLr78, 2018, 3 pages.
International Preliminary Report on Patentability Chapter I received in PCT Application Serial No. PCT/US2020/013562 dated Jul. 29, 2021, 10 pages.
Rice et al., "A Next Generation Bivalent Human Ad5 COVID-19 Vaccine Delivering Both Spike and Nucleocapsid Antigens Elicits Th1 Dominant CD4+, CD8+ T-cell and Neutralizing Antibody Responses", bioRxiv preprint, 2020, 36 pages.

* cited by examiner

ARAGONITE USES

This application claims priority to U.S. Provisional Application No. 62/792,735 filed on Jan. 15, 2019, U.S. Provisional Application No. 62/867,489 filed on Jun. 27, 2019, and U.S. Provisional Application No. 62/874,253 filed on Jul. 15, 2019 the entire contents of all of which are herein incorporated by reference.

FIELD OF THE INVENTION

The field of the invention relates to compositions and methods of generating calcium carbonate-based composition for various uses, including compositions for road paving.

BACKGROUND

The background description includes information that may be useful in understanding the present disclosure. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Calcium carbonate is a common substance found in rocks, pearls, and the shells of eggs or marine organisms (e.g., mollusk, corals, etc.). Calcium carbonates are used in many industry fields including: the construction industry as a building material; the oil industry as formation-bridging and filtercake-sealing agent in the drilling fluid; and household uses including glues, chalks, and fillers. In addition, calcium carbonates are frequently used in health and food industries including gastric antacid, calcium supplements, phosphate binder for the treatment of hyperphosphatemia (for chronic renal failure patient), and medical uses including dental implant, tissue scaffolds, etc.

Calcium carbonate in nature generally exists in two forms: calcite or aragonite. Aragonite is formed naturally in all mollusk shells and in the calcareous endoskeletons of warm- and cold-water corals. Aragonite also accumulates as inorganic precipitates from marine cements in the ocean. While aragonite shares the same chemistry with calcite, aragonite is a polymorph of calcite having different symmetry and crystal structure from calcite. For example, in aragonite, the carbonate ions lie in two planes that point in opposite directions. This bi-planar configuration destroys the trigonal symmetry that is characteristic of calcite's structure. Aragonite's bi-planar structure gives rise, in turn, to aragonite's orthorhombic symmetry and relative instability at high temperature. Amorphous calcium carbonate can form into aragonite in specific conditions (e.g., coral-growing conditions). Such formed aragonite provides benefits being more resistant in shear stress and lower pH conditions.

These properties of aragonite make it useful in various circumstances. For example, Kon et al. (2015) *J. Orthop. Surg. Res.* 10:81 report that aragonite can be used as a tissue scaffold (e.g., aragonite-hyaluronate scaffold) that is used for osteochondral regeneration. WO 2010/146574 to Altschuler reports that aragonite-based scaffolds can be used for repair, regeneration, enhancement of formation of cartilage and/or bone. U.S. Pat. No. 5,480,827 to Guillemin reports that porous polycrystalline aragonite can be used as a support material for cell culture.

Asphalt is widely used for making roads. Asphalt is a dark brown to black cementitious material in which the predominating constituents are bitumens that occur in nature or are obtained in petroleum processing. Bitumen is a generic term for natural or manufactured black or dark-colored solid, semisolid, or viscous cementitious materials that are composed mainly of high molecular weight hydrocarbons.

The widespread use of asphalt in making roads relies on its remarkable waterproofing and binding properties. The hard surfaces of roads, for example, depend on the ability of asphalt to cement together aggregates of stone and sand.

A number of factors impinge on the performance of asphalt. These include its composition and the crude oil source, the type and amount of aggregate used, the presence of moisture, the method of road construction, surrounding temperature, exposure to sun, and, of course, the volume of traffic. Ideally, asphalt used for paving roads should remain viscoelastic in all weather conditions. However, many asphalt roads soften in summer during high temperatures and suffer from rutting, or permanent deformation. At low temperatures, neutral molecules in asphalt arrange themselves into more organized structural forms. As a result, the material hardens, becomes brittle, and cracks under the stress of heavy traffic loads. This is known as thermal or fatigue cracking.

Asphalt compositions may also lose their plasticity. In particular, asphalt compositions harden and crack or crumble when they lose their more volatile lower molecular weight constituents or when these constituents are oxidized. This process is known as aging. Moisture from rain and other sources can also invade and damage asphalts, and aged or oxidized asphalts are most susceptible to moisture damage because they have a larger number of polar constituents to attract water molecules.

Furthermore, unrepaired roads are a dangerous hazard for drivers, while repair or replacement of roads is costly for small and large governments. Additionally, most asphalt compositions are fire and explosion hazards and are not environmentally favorable. As such, dangers and hazards to people and the environment are associated with conventional asphalt compositions.

Therefore, there remains a need for improved compositions and methods for making roads, such as compositions where asphalt is modified to make the road longer lasting—e.g., having a higher mechanical performance and/or being more fire resistant.

SUMMARY

Disclosed herein are various compositions of, methods for, and use of aragonite-based compositions and formation of various forms of crystals/shapes of aragonite-based compositions. Aragonite-based compositions include pavement compositions for making roads. Preferably, the road pavement composition includes a bituminous conglomerate, graphene, and aragonite.

Preferably, the bituminous conglomerate of the road pavement composition includes a thermoplastic polymer selected from the group consisting of polyvinylbutyral (PVB), polyethylacrylate (PEA) polymethylacrylate (PMA), polybutylacrilate (PBA), and lignin. The composition may further include aggregate and/or reclaimed asphalt pavement, which advantageously results in an environmentally sustainable road pavement composition. Alternatively or additionally, the bituminous conglomerate is selected from the group consisting of: naturally occurring bitumen, bitumen derived from crude oil, petroleum pitch obtained from a cracking process, coal tar, polymer-modified bitumen, rubberized bitumen, rubberized bitumen containing recycled tire material, acid-modified bitumen, wax-modified bitumen, and combinations thereof.

The aragonite used herein for the road pavement composition may comprise a plurality of restructured calcium carbonate particles having an average diameter less than or equal to 10 μm. For example, the average particle diameter of the aragonite may be between 100 nm and 10 μm. additionally, or alternatively, at least half of the plurality of restructured calcium carbonate particles have a diameter between 100 nm and 10 μm. The aragonite is contemplated to be between 0.0005% to 5% of the total weight of the composition. In some cases, the aragonite is derived from a portion of a marine animal.

Preferably, the graphene used in the compositions and methods disclosed herein may be between 0.0005% to 1% of the total weight of the composition. In some cases, the graphene is recycled graphene. Typically, the graphene is graphene nanoplatelets.

In some embodiments, the composition may further comprise a surfactant. The surfactant may be between 0.0005% to 2% of the total weight of the composition.

Advantageously, the pavement composition as disclosed herein is highly fire resistant. For example, in some embodiments, the composition may have an ignition temperature of at least 1000° C.

As a further advantage, the pavement composition as disclosed herein has increased strength compared to conventional pavement compositions without aragonite and/or graphene. Preferably, the pavement composition has increased strength and is less prone to buckling and/or rutting than conventional pavement compositions. Strength of the pavement composition may be measured using indirect tensile strength as disclosed herein.

Further disclosed herein is a method of making a paved road with improved mechanical properties, comprising, mixing the composition as disclosed herein with stirring and compression at a temperature between 130° C. and 200° C., and laying the composition on the ground with mechanical pressure, to form the paved road. The method may further comprise blowing air through the hot composition to remove more volatile compounds, leading to a longer lifetime and added mechanical properties of the paved road.

In additional aspects of the contemplated subject matter, calcium carbonate-based compositions are disclosed herein comprising a plurality of restructured calcium carbonate particles coupled with a plurality of matrix molecule. In certain embodiments, the plurality of restructured calcium carbonate particles have an average size ≤10 μm in diameter. In certain other embodiments, the particles have an average diameter of 10 mm, 20 mm, 30 mm, 40 mm, or even ≥50 mm. Most typically, the restructured calcium carbonate particles derive from a portion of a marine organism comprising aragonite. In some embodiments, the aragonite is coupled with a protein. In certain embodiments, an aragonite nanoparticle is coupled with a protein to make a pearl composition. Exemplary embodiments include a 3D printed aragonite nanoparticle including (e.g., coupled to) a protein forming a pearl particle or nanoparticle.

In some embodiments, the restructured calcium carbonate is generated by unstructuring the aragonite using an acid and a chelator and recrystallizing the unstructured aragonite. Preferably, the acid is sodium citrate or citric acid, and/or the chelator is EDTA or EGTA. Then, in some embodiments, the recrystallizing step further comprises a step of spray-drying the unstructured aragonite. Preferably, the composition has a decomposition temperature of at least 1000° C.

Preferably, the average particle size is between 100 nm and 10 μm in diameter, and/or at least half of the plurality of restructured calcium carbonate particles have a size between 100 nm and 10 μm in diameter.

In some embodiments, the matrix molecule is graphene. Alternatively and/or additionally, the plurality of restructured calcium carbonate particles forms a first layer and the plurality of matrix molecules form a second layer.

Also disclosed herein are methods of making calcium carbonate-based compositions. These methods include a step of preparing aragonite slurry comprising unstructured aragonite, reconstituting the unstructured aragonite as a restructured calcium carbonate particle having an average size ≤10 μm in diameter, and morphing the restructured calcium carbonate particle into a customized form. For example, morphing may include 3D printing.

In some embodiments, the aragonite slurry is prepared using acid and chelator. Preferably, the acid is sodium citrate or citric acid, and/or the chelator is EDTA or EGTA. In some embodiments, the reconstituting step further comprises a step of spray-drying the unstructured aragonite. Preferably, the composition has a decomposition temperature ≥1000° C.

Preferably, the average particle diameter is between 100 nm and 10 μm, and/or at least half of the plurality of restructured calcium carbonate particles have a diameter between 100 nm and 10 μm.

In some embodiments, the method further comprises coupling the reconstituted unstructured aragonite with a matrix molecule. In some embodiments, the matrix molecule is graphene and/or polylactic acid or ethylene, with which the unstructured aragonite can form a polymer.

Various objects, features, aspects and advantages of the inventive subject matter will become more apparent from the following detailed description of preferred embodiments.

DETAILED DESCRIPTION

Figure 1:
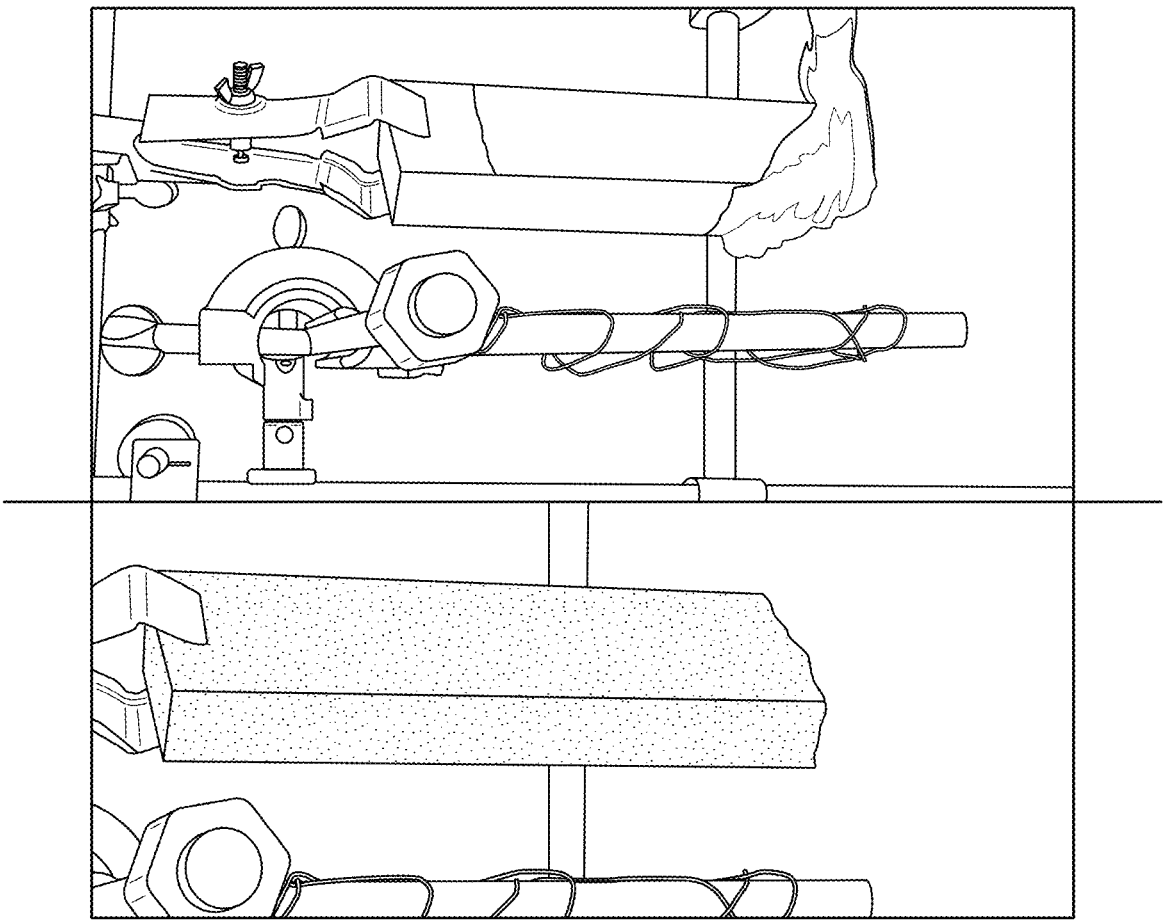
FIG. 1 illustrates the flame retardant properties of compositions disclosed herein.

As explained herein, calcium carbonate minerals, especially in a form of aragonite, can be processed to recrystallize and/or reform in various shapes for various uses while taking advantage of the mechanical and chemical properties of the calcium carbonate minerals. Thus, in one especially preferred aspect, the calcium carbonate minerals can be unstructured into amorphous molecular configurations, which can then be restructured/recrystallized into a desired crystalline form or shape. Throughout the instant disclosure, the terms "aragonite" and "calcium carbonate" are used interchangeably, and refers to the naturally occurring forms of calcium carbonate, $CaCO_3$.

Any suitable sources of calcium carbonate minerals are contemplated. For example, calcium carbonate minerals can be obtained from calcite sources including inorganic sources such as limestone, metamorphic marble, volcanic rocks, and/or organic sources such shells or marine organisms (e.g., plankton, algae, etc.). More preferably, calcium carbonate minerals can be obtained from aragonite sources, such as mollusk shells and calcareous endoskeletons of warm- and cold-water corals, or as inorganic precipitates as marine cements. It is further contemplated that where the calcium carbonate minerals are obtained from organic sources, it is preferred that organic molecules (e.g., proteins, lipids, etc.) in the calcium carbonate minerals be removed through any suitable procedures (e.g., protease treatment, etc.) before further processing of the calcium carbonate minerals.

Methods and Uses of Aragonite in Pavement Compositions

In an especially advantageous aspect of the instant disclosure, the inventors have found that using aragonite beads or particles in a bituminous composition for paving roads provides for a pavement composition having higher mechanical performance (e.g., increased strength), greater fire retardant properties, similar or superior compaction, with at least an equal cure rate to conventional pavement compositions. Furthermore, the use of aragonite beads in road pavement compositions renders the roads less susceptible to ignition and fire. Preferably, the pavement composition disclosed herein also comprises graphene. The combination of graphene and aragonite in the pavement composition provides for increased strength while being more environmentally favorable with a lower carbon footprint.

The terms "bitumen" or "bituminous" in the present invention refer to naturally-occurring bitumen and modified bitumen. They are also known as "asphalt." Any known bitumen that meets specifications of performance grade, viscosity grade, or penetration graded may be used in the compositions of the present disclosure. Suitable aggregates have properties that meet specifications established by the appropriate transportation authorities as suitable for use in construction of load-bearing pavements. For example, the bituminous conglomerate used herein may comprise one or more of the following: naturally occurring bitumen, bitumen derived from crude oil, petroleum pitch obtained from a cracking process, coal tar, polymer-modified bitumen, rubberized bitumen, rubberized bitumen containing recycled tire material, acid-modified bitumen, wax-modified bitumen, and combinations thereof. The bituminous conglomerate may also contain additives such as natural rubber, synthetic rubber, plastomer, thermoplastic resin, thermosetting resin, elastomer, styrene-butadiene-styrene, styrene-butadiene-rubber, polyisoprene, polybutylene, butadiene-styrene rubber, vinyl polymer, ethylene vinyl acetate, ethylene vinyl acetate derivative, sulfur-containing crosslinker, salt, acid modifier, wax modifier, and combinations thereof. The bituminous conglomerate may further comprise an acid modifier, such as, tall oil acid, distilled tall oil, crude tall oil, tall oil pitch, phosphoric acid, derivative of tall oil acids, phosphoric acid derivative of tall oil pitch, polyphosphoric acid, and combinations thereof.

A number of factors affect the performance of asphalt and/or bituminous conglomerates. These include its composition and the crude oil source, the type and amount of aggregate used, the presence of moisture, the method of road construction, temperature, and, of course, the volume of traffic. Ideally, asphalt used for paving roads should remain viscoelastic in all weather conditions. However, many asphalt roads soften in summer and suffer from rutting, or permanent deformation, as it is also called. At low temperatures, neutral molecules in asphalt arrange themselves into more organized structural forms. As a result, the material hardens, becomes brittle, and cracks under the stress of heavy traffic loads. This is known as thermal and fatigue cracking. Asphalts also lose their plasticity and therefore harden and crack or crumble when they lose their more volatile lower molecular weight constituents or when these constituents are oxidized.

The presence of aragonite mixed with the asphalt is contemplated to enable the pavement composition to maintain its viscoelasticity and plasticity for a longer period of time. Additionally, or alternatively, calcium carbonate particles derived from a portion of a marine organism may also be used. Thus, in other words, the terms "aragonite" and "calcium carbonate particles" are used interchangeable in this disclosure.

The amount of aragonite contemplated in the pavement compositions disclosed herein is at least 50%, or more preferably at least 45%, or more preferably at least 40%, or more preferably at least 35%, or more preferably at least 30%, or more preferably at least 25%, or more preferably at least 20%, or more preferably at least 15%, or more preferably at least 10%, or more preferably at least 5%, or more preferably at least 3%, or more preferably at least 1%, and in some cases, at least 0.0005%.

The aragonites, or calcium carbonate particles, are contemplated to have an average size ≤10 μm in diameter. As used herein, "diameter" conveys the longest transverse distance through the particle that passes through the particle's center of mass.

In some embodiments, the restructured calcium carbonate is generated by unstructuring the aragonite using an acid and a chelator and recrystallizing the unstructured aragonite as disclosed in more detail herein. Preferably, the acid is sodium citrate or citric acid, and/or the chelator is EDTA or EGTA. Then, in some embodiments, the recrystallizing step further comprises a step of spray-drying the unstructured aragonite. Preferably, the composition has a decomposition temperature of at least 1000° C.

Preferably, the average particle size is between 100 nm and 10 μm in diameter, and/or at least half of the plurality of restructured calcium carbonate particles have a size between 100 nm and 10 μm in diameter.

Additionally, the road pavement composition disclosed herein may also comprise a surfactant. The presence of surfactant delays aging process in roads. Moisture from rain and other sources can invade, and age asphalts, particularly aged or oxidized asphalts because they have a larger number of polar constituents to attract water molecules. The presence of a surfactant presents additional benefits to the composition, such as improved interfacial stability. A surfactant or combination of surfactants having structural attributes that impart low interfacial viscosity, low Marangoni effect, and high interfacial bitumen solubility at a temperature range of about 60° C. to about 120° C. to improve interfacial stability are contemplated.

In more preferred embodiments, the road pavement composition disclosed herein includes both aragonite and graphene mixed with the asphalt conglomerate. The graphene as contemplated herein is a carbon material with two-dimensional structure of carbon monoatomic layers with hexagonal matrix, wherein each carbon atom is bound to other three carbon atoms by a covalent bond and bound to the atoms of the adjacent layers by Van Der Waals forces, as well as it is meant any derivative functionalized of such carbon material, for example graphene oxide, i.e. graphene partially functionalized with oxygen comprising groups. The amount of graphene contemplated in the pavement compositions disclosed herein is at least 20%, or more preferably at least 15%, or more preferably at least 10%, or more preferably at least 5%, or more preferably at least 3%, or more preferably at least 1%, or more preferably at least 0.5%, or more preferably at least 0.1%, and in some cases, at least 0.0005%.

In some embodiments, the graphene used in the pavement compositions disclosed herein may be recycled graphene. Alternatively, the graphene used in the compositions disclosed herein may be virgin graphene, or a mixture of recycled graphene and virgin graphene. Preferably, the recycled and/or virgin graphene is in the form of graphene nanoplatelets. Graphene nanoplatelets are formed from a physical transformation of natural graphite. Graphene nanoplatelets have a high aspect ratio, have high lateral dimension (in the micron (um) range), and a low thickness (in the nanometer (nm) range). With reference to FIG. 1, graphene nanoplatelets coated on polystyrene provide a fire retardant protection (lower object) compared to polystyrene without a coating (upper object).

In one aspect, a paved road having high mechanical properties and longevity may be made using the compositions disclosed herein made of a bituminous. For example, the bituminous conglomerate as disclosed herein may be added to a metal vessel secured to a ring stand and heated on a hot plate to the target temperature of about 100° C. to 1000° C., and more preferably 100° C. to about 800° C.; and more preferably 200° C. to about 500° C. The heated bitumen is stirred in a high-shear mixer with serrated shear head at a speed at least, 16,000 rpm. Additives such as graphene and aragonite, and optionally a surfactant are added. The resulting dispersion is sampled for bitumen content, and then added to dense-graded paving grade aggregate having a temperature of about 60° C. to about 120° C. Finally, the aggregated composition is laid on the ground with mechanical pressure to make the road.

The paving composition made of a bituminous conglomerate together with aragonite and graphene as disclosed herein provides for a pavement composition having increased strength. A pavement composition with increased strength lasts longer—e.g., longer use as a functional road without damage such as potholes, buckling, or rutting. For example, the pavement composition may last up to 250% longer, at 40° C. the pavement composition may be up to 46% less prone to buckling, and/or the pavement composition may be resistant to ruts with up to a 35% decrease in rutting at 60° C.

In exemplary embodiments, the pavement composition made of a bituminous conglomerate together with aragonite and graphene as disclosed herein has a tensile strength greater than a pavement composition made with the bituminous conglomerate without the graphene and/or aragonite. Tensile strength may be measured as indirect tensile strength in MPa as disclosed in EN 12697-23. Additionally, the pavement composition made of a bituminous conglomerate together with aragonite and graphene as disclosed herein may have a greater resistance to rutting than a pavement composition made with the bituminous conglomerate without the graphene and/or aragonite. Rutting is a phenomenon of longitudinal deformation from the passage of wheels that causes a progressive lateral movement of the bituminous conglomerate mixtures. Rutting resistance may be measured by measuring the depth of a rut (e.g., in millimeters (mm)).

Additionally or alternatively, the pavement composition made of a bituminous conglomerate together with aragonite and graphene as disclosed herein has increased stiffness (e.g., greater resistance) compared to a pavement composition made with the bituminous conglomerate without the graphene and/or aragonite. The Stiffness Modulus of a pavement measures the ability of the bituminous mixture to spread in the superstructure as a result of load pressure (e.g., in a tire footprint area).

Also additionally or alternatively, the pavement composition made of a bituminous conglomerate together with aragonite and graphene as disclosed herein has greater durability than a pavement composition made with the bituminous conglomerate without the graphene and/or aragonite. Durability or fatigue resistance may be measured as fatigue cycles, wherein a fatigue resistance test simulates the pavement service life by subjecting the asphalt pavement sample to repeated cycles of deformation states caused by both vehicular traffic and seasonal cycles.

Methods and Uses of Aragonite in Compositions

Calcium carbonate minerals (including minerals pre-processed to remove organic molecules) can then be treated with unstructuring reagents to reduce the calcium carbonate minerals into amorphous calcium carbonate particle. As used herein, "unstructuring" refers to any processing that changes the crystallized structure of the calcium carbonate in the raw material to amorphous structure or to another structure. Exemplary unstructuring reagents include acid, preferably citric acid or its salt forms such as sodium citrate, formic acid, hydrochloric acid, nitric acid, sulfuric acid, hydrogen halide, halogen oxoacid, hypochloric acid, chloric acid, perchloric acid, periodic acid, a fuorosulfuric acid, a phosphoric acid, a fluoroantimonic acid, a fluoronoric acid, a hexafluorophosphoric acid, acetic acid, gluconic acid, lactic acid, oxalic acid, tartaric acid, chromic acid, sodium dioctylsulfosuccinate, polyaspartic acid, ethylenediamine tetraacetic acid (EDTA), diethylenetriaminepentaacetic acid (DTPA), pyromellitic acid (PMA), aminotriacetic acid, aminodiacetic acid, or hydroxy polycarboxylic acid.

In some embodiments the unstructuring reagents may also include a chelator such as EDTA, or ethylene glycol-bis($\beta$)-aminoethyl ether)-N,N,N',N'-tetraacetic acid (EGTA), (1,2-bis(o-aminophenoxy)ethane-N,N,N',N'-tetraacetic acid) (BAPTA), N,N-bis(2-hydroxyethyl) glycine (Bicine), trans-1,2-diaminocyclohexane-ethylenediamine-N,N,N',N'-tetraacetic acid (CyDTA), 1,3-diamino-2-hydroxypropane-efhylenediamine-N,N,N',N'-tetraacetic acid (DPTA-OH), diethylenetriamine-N,N,N',N'',N''-pentaacetic add (DPTA), ethyl enediamine-N,N'-dipropionic acid dihydrochloride (EDDP), ethylenediamnine-N,N'-bis(methylenephosphonic acid) hemihydrate (EDDPO), N-(2-hydroxyethyl)ethylenediamine-N,N,N'-triacetic acid (EDTA-OH), ethylenediamine-N,N,N'N'-tetrakis (methylenephosphonic acid) (EDTPO), O,O'-bis(2-aminoethyl), N,N'-bis(2-hydroxybenzyl)ethylenediamine-N,N'-diatetic acid (HBED), 1,6-hexamethylenediamine-N,N,N',N'-tetraacetic acid (HDTA), N-(2-hydroxyethyl)iminodiacetic acid (HIDA), iminodiacetic acid (IDA), 1,2-diaminopropane-N,N,N',N'-tetraacetic acid (methyl-EDTA), nitrilotriacetic acid (NTA), nitrilotripropionic acid (NTP), nitrilotris(methylenephosphonic acid) trisodium salt (NTPO), N,N,N',N'-tetrakis(2-pyridylmethyl)ethylenediamine (TPEN), and triethylenetetramine-N,N,N',N'',N'''-hexaacetic acid (TTNA), rhod-2, DMSA, FLUO 3, FURA 2, INDO 1, or QUIN 2.

Any suitable amounts and ratios of unstructuring reagents are contemplated. For example, the acid may comprise at least 10 wt %, at least 20 wt %, at least 30 wt %, at least 40 wt %, less than 80 wt %, less than 70 wt %, less than 60 wt %, less than 50 wt % of the total unstructuring reagent or total reaction volume including the calcium carbonate mineral reacting with the unstructuring reagent. In another example, the chelator may comprise at least 0.1 wt %, at least 1 wt %, at least 5 wt %, at least 10 wt %, less than 50 wt %, less than 30 wt %, less than 10 wt %, less than 5 wt % of the total unstructuring reagent or total reaction volume including the calcium carbonate mineral reacting with the unstructuring reagent.

In certain embodiments, the chelator in the unstructuring reagent can act as a slow decalcifier by binding ionized calcium present on the outer layer of the mineral crystal and slowly reducing the size of the crystal. In addition, the acid in the unstructuring reagent can facilitate the dissolution of the calcium carbonate mineral. Thus, contacting calcium carbonate mineral with unstructuring reagent will generate a calcium carbonate slurry (amorphous calcium carbonate particles) with more homogenous crystal sizes and/or particle sizes. Preferably, the calcium carbonate slurry comprises particles of average diameter between 10 nm and 100 µm, preferably between 50 nm and 50 µm, and more preferably between 100 nm and 10 µm. Alternatively, the calcium carbonate slurry comprises at least 30%, at least 50%, at least 70%, at least 90% of the particles of average diameter between 10 nm and 100 µm, preferably between 50 nm and 50 µm, and more preferably between 100 nm and 10 µm.

The reaction duration or treatment time of unstructuring reagents with calcium carbonate mineral may vary depending on the types and concentration of chelator and/or acid in the unstructuring reagents. For example, a preferred reaction duration or treatment time is sufficient to generate a calcium carbonate slurry having particles of average diameter between 10 nm and 100 µm, preferably between 50 nm and 50 µm, and more preferably between 100 nm and 10 µm, or sufficient to generate a calcium carbonate slurry, in which at least 30%, at least 50%, at least 70%, at least 90% of the particles have average diameter between 10 nm and 100 µm, preferably between 50 nm and 50 µm, and more preferably between 100 nm and 10 µm.

In certain embodiments, the calcium carbonate slurry can be subject to vacuum rotation (spinning) and/or evaporation to remove at least 70%, at least 80%, at least 90% of the residual acid (e.g., sodium citrate, citric acid, etc.) from the slurry to increase the calcium carbonate content in the slurry, to stop dissolution, and to facilitate the crystal formation from the amorphous particles.

Various conditions including temperature, pH, addition of crystal modifiers, water content, alcohol content, time, presence of stabilizers (e.g., double hydrophilic block copolymers (DHBCs) composed of poly(ethylene oxide) (PEO) and poly(acrylic acid) (PAA), etc.), and/or status of slurry (e.g., shaking, spinning, etc.) may affect the speed and effectiveness of precipitation and crystal formation, as well as morphology of the crystals. Therefore, various calcium carbonate crystal morphologies can be obtained by modifying environmental conditions during calcium carbonate precipitation and crystal formation. As used herein, "morphology" refers not only to crystal shape (e.g., cube, prism, pyramid, cuboid, elongated cuboid, elongated tube, etc.), but also crystal size (e.g., thickness, length, diameter, etc.). For example, smaller cuboid crystals at a diameter between 1-5 µm and/or thickness may be obtained where the calcium carbonate slurry is precipitated at room temperature with spinning condition (e.g., 4500 rpm at an angle between 30-50 degree, etc.). In another example, larger cuboid crystals or elongated cuboid crystals at a diameter of 5-10 µm and/or thickness may be obtained where the calcium carbonate slurry is precipitated at room temperature without spinning or shaking. In still another example, a dendritic, flatter crystal structure of aragonite can be obtained by addition of alcohol and/or water (e.g., at least 5 wt %, at least 10 wt %, at least 15 wt % of the calcium carbonate slurry) and/or with spinning and/or shaking the calcium carbonate slurry during precipitation.

Additionally, crystals in calcium carbonate slurry can be purified by spray-drying to remove all non-crystalized calcium carbonate molecules as well as other reagents contained in the calcium carbonate slurry (e.g., acid, chelator, salt, water, alcohol, etc.). Any suitable technique/conditions of spray-drying of the slurry can be used. For example, the spray-drying operation may be carried by placing atomizing nozzles near the drying gas source and spraying the slurry concurrently or in the same direction as the flow of the drying gas at temperatures from about 200° F. to about 1500° F., preferably from about 250° F. to about 1200° F., and more preferably from about 300° F. to about 800° F.

In some embodiments, the calcium carbonate slurry or restructured calcium carbonate crystals may be coupled or reacted with a matrix molecule to modify its chemical and/or physical characteristics. Thus, as used herein, a matrix molecule can be any molecule that can be chemically or physically coupled with the restructured calcium carbonate crystals or calcium carbonate polymorphs to form a physically or chemically distinct material or substance. For example, the calcium carbonate slurry (or calcium carbonate polymorph) may be mixed with a plasticizing reagent (a type of matrix molecule) to form a polymer. Exemplary suitable plasticizing reagents include polylactic acid, ethylene, chitosan, polyaspartate, magnesium chloride, and so on. For example, calcium carbonate polymorphs in the calcium carbonate slurry can react with chitosan, polyaspartate or polyacrylic acid, and/or magnesium chloride to form a thin film or a distinct polygonal crystal. In another example, calcium carbonate polymorphs in the slurry can react with polylactic acid (PLA) to form a copolymer (e.g., nano particle calcium carbonate (n-NPCC) copolymer with PLA or PLA/n-NPCC composite), for example using co-rotating extruder and $2^n$ factorial planning. It is contemplated that such PLA/n-NPCC composite generated from calcium carbonate polymorphs in the calcium carbonate slurry can add rigidity to biocompatible PLA polymer such that the copolymer can be used as a biocompatible plastic (or plastic substitute) with less brittle fracture behavior.

In more specific aspects of the contemplated subject matter, calcium carbonate-based compositions are disclosed herein comprising a plurality of restructured calcium carbonate particles coupled with one or more matrix molecules. In certain embodiments, the plurality of restructured calcium carbonate particles have an average size ≤10 µm in diameter. In certain other embodiments, the particles have an average diameter of 10 mm, 20 mm, 30 mm, 40 mm, or even ≥50 mm. As used herein, "diameter" conveys the longest transverse distance through the particle that passes through the particle's center of mass. Most typically, the restructured calcium carbonate particles derive from a portion of a marine organism comprising aragonite. In some embodiments, the matrix molecule is coupled with a protein. In typical embodiments, an aragonite nanoparticle is coupled with a protein to make a pearl composition. Exemplary embodiments include a 3D-printed aragonite nanoparticle including (e.g., coupled to) a protein forming a pearl nanoparticle.

In other embodiments, restructured calcium carbonate crystals (obtained from unstructuring and recrystallizing process) can be further modified by coupling with graphene, carbon nanotubes, nano clay, or graphdiyne to modify the tensile strength, mechanical shear stress resistance, electric or thermal conductivity, or other chemical or mechanical properties (e.g., high temperature resistance, etc.). For example, the restructured calcium carbonate crystals can form a thin sheet or layer and a plurality of graphene (or carbon nanotubes, nano clay, or graphdiyne) can be placed in between the sheets or layers of restructured calcium carbonate crystals (e.g., sandwich structure), which can be resistant to high heat (e.g., a decomposition temperature of at least 1000° C., etc.). Alternatively, restructured calcium carbonate crystals can be encapsulated or captured inside the hollow spaces created by web-like structure of graphene or carbon nanotubes.

In certain embodiment, the restructuring process of calcium carbonate described above enables the morphing of calcium carbonate into various forms that are suitable in industrial uses. In one embodiment, such restructured calcium carbonate has medical uses, including dental structure (e.g., artificial bone material for dental implant procedure, artificial dental root, artificial tooth enamel substitute, etc.), tissue scaffolds (e.g., osteoinductive bone substitute, etc.), or cell growth or tissue culture substrate (e.g., 2D or 3D model of cell culture substrate, etc.). For example, morphing may be carried out by 3D printing.

Further, the restructured calcium carbonate can be used to reduce carbon footprint and environmental impact in limestone mining. Also, the restructured calcium carbonate can be used to develop new synthetic materials that substitutes glass, paper, or plastic (with higher tensile strength or higher resistance to shear stress, etc.) that enable manufacturing a thin (and/or pliable) casing for any hardware product (e.g., backend casing of a slim, wallpaper TV, etc.).

Figure 2:
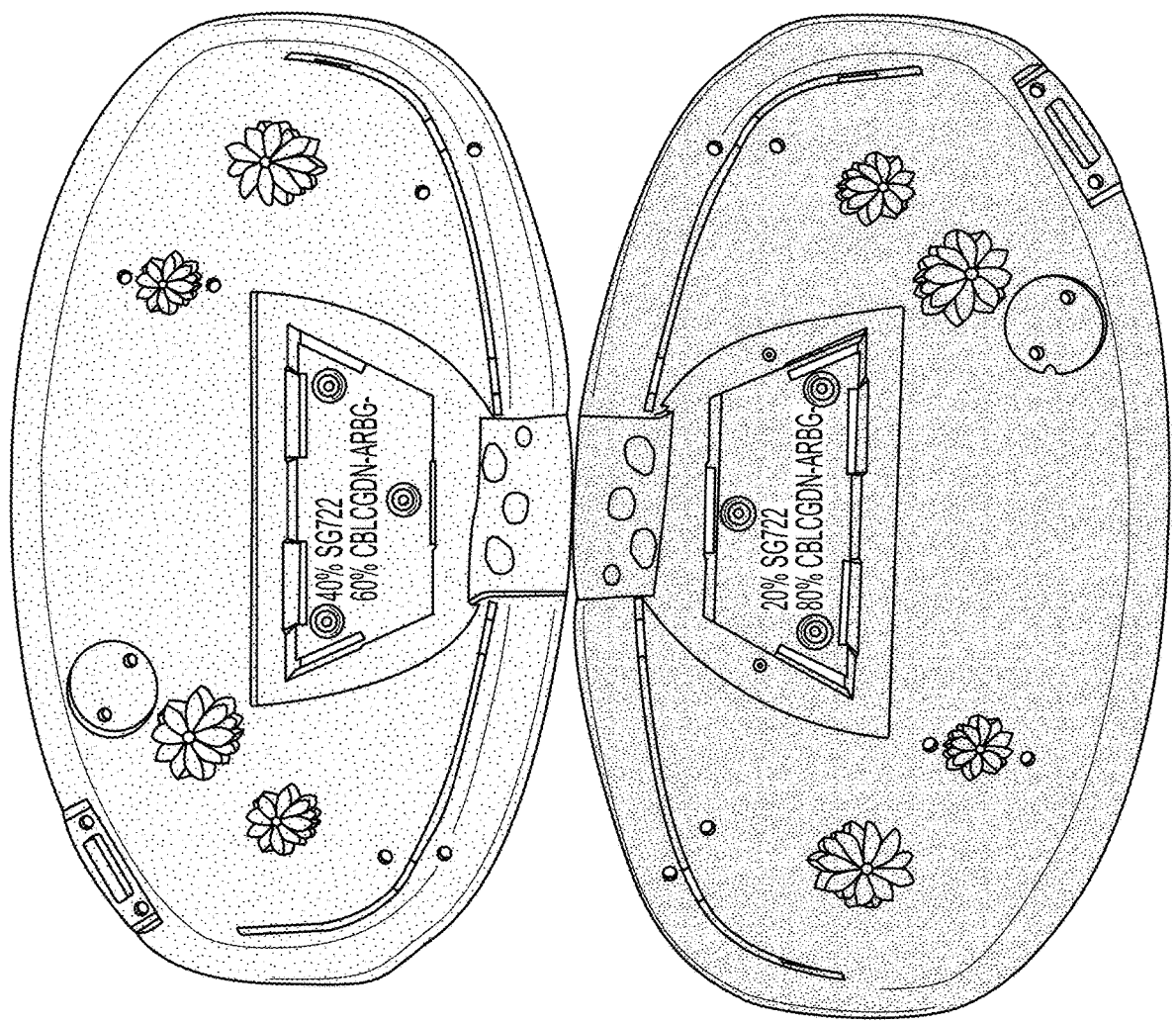
FIG. 2 shows a mold generated using a material containing restructured calcium carbonate.

Still further, the restructured calcium carbonate can be used to generate a material suitable for forming a mold as shown in FIG. 2 (e.g., injection molding, etc.) (e.g., replacing gypsum plasters, polyurethane, rubbers, epoxy, silicone, etc.). In such case, the material may contain at least 10%, at least 20%, at least 30%, at least 40%, at least 50%, at least 60%, at least 70% of aragonite combined or co-polymerized with other traditional mold materials. Alternatively, the mold material can be substantially pure aragonite, having aragonite content over 90% w/w, over 95% w/w, or over 99% w/w. Alternatively and/or additionally, the restructured calcium carbonate can be used to develop new synthetic materials (in a solid form or semi-liquid form, etc.) as a 3D printing ink material.

In addition to the asphalt pavement composition, restructured calcium carbonate as described herein can be used as construction materials including "green" concrete material, plastic substitute, or a filter material. For example, a strong engineered wood board can be generated using a combined material of wood chips, aragonite, graphene, and/or a binder. In such example, wood chips, aragonite, graphene, and/or a binder can be placed separately in each layer (e.g., wood chip layer, aragonite layer, graphene layer, binder layer, etc.) or a composite of one or more materials (e.g., wood chip layer, aragonite and graphene layer, binder layer, etc.). Alternatively, wood chip, aragonite, graphene, and binder can be all mixed in one layer as a composite material. Optionally, such generated engineered wood board material can be further processed to be capped or clad with graphene, and/or a combination of the restructured calcium carbonate with stone powder and graphene. Additionally, the engineered wood board material can be painted with a paint containing graphene-restructured calcium carbonate.

Alternatively and/or additionally, the restructured calcium carbonate can be used to generate a fabric material for clothing or for any other goods using such fabric material. For example, the restructured calcium carbonate can be added to a graphene-polymer composite (where the graphene is mixed with the polymer as a single-layer flat sheet), in a single layer within the same layer of the graphene-polymer composite or in a single layer as a separate layer on top of the graphene-polymer composite (e.g., as a coating layer, etc.) to generate a fibrous material and/or a material for clothings, etc. In some embodiments, the polymer can be polypropylene, polychloroprene (neoprene or pc-rubber), or any other types of rubber or rubber-like polymer, which can be used in light-weight, water-proof, and/or thermal-insulating garments including wet suits, purses, and/or other types of clothing, covers, etc. Alternatively and/or additionally, such restructured calcium carbonate-graphene-polymer composites can be used as fillers for providing thermal insulations (e.g., filler for jacket, filler material for construction, etc.) or a material for thermal storage (e.g., bricks, layers, sheets, drywall, balls, pellets, etc.).

The restructured calcium carbonate can be used to generate a multi-purpose absorption material when it is restructured as a highly-porous and high-surfaced material. For example, the composite material containing restructured calcium carbonate can absorb oil spills onshore or offshore or absorb greenhouse gas (e.g., methane gas) or flue gas (especially NOx). Where the restructured calcium carbonate absorbs methane gas, it is preferred that the restructured calcium carbonate be formulated (or restructured) with a sorbent selectivity of $CH_4$ over $CO_2>1$. In such example, absorbed $CH_4$ in the restructured calcium carbonate-containing material can be further processed (e.g., as a fuel cell or battery, etc.) to generate alternative fuels (e.g., alcohol) by electrochemical oxidation (e.g., electrocatalytic conversion of methane, etc.). Alternatively and/or additionally, where the restructured calcium carbonate absorbs flue gas (especially NOx and/or $SO_2$), the restructured calcium carbonate can be used as an adsorbent material of a pressure swing adsorption system as a trap for nitrogen molecules or $SO_2$ gas at high pressure. Thus, in one embodiment, the restructured calcium carbonate (and optionally graphene nanoplates (GNP)) can be combined with coal to generate more environmentally friendly coal for household or industrial use. Such coal, at high temperature while burning, can sequester $CO_2$ and/or $SO_2$ gas in the coal to prevent air pollution as well as to reuse the sequestered carbon or sulfur in the used coal.

In another example, composite materials containing restructured calcium carbonate can be used to absorb any toxic gas or molecule (e.g., nerve gas, etc.) as a detoxifying agent or as a protecting gear. In still another embodiment, composite materials containing restructured calcium carbonate can be used to absorb hydrogen molecules as an energy storage compartment.

Alternatively, composite materials containing restructured calcium carbonate can be formed into beads to carry pharmaceutical compositions, drugs, or any other chemicals (e.g., fertilizer, etc.) or biological materials (e.g., bacteria, yeast, for microbiome delivery to the gastrointestinal tract, etc.), for which delayed release is desirable. In such example, the restructured calcium carbonate is preferably formulated (or restructured) such that the restructured calcium carbonate includes porous structures to hold pharmaceutical composition, drugs, chemicals, or biological materials. Such beads can hold at least one molecules (or organism (e.g., bacteria, yeast, etc.)), at least two molecules, at least 5 molecules per porous structure.

In certain embodiments, composite materials containing restructured calcium carbonate having an absorption and delayed release characteristics can be further used to generate various household items including pet-related items (e.g., cat litter, etc.), an odor remover (e.g., deodorant, etc.), sanitary products, or any other cleaning materials. In such example, the composite material preferably includes bactericidal graphene.

In some embodiments, restructured calcium carbonate as described herein can be used as a food source. For example, restructured calcium carbonate can be infused with non-animal protein (e.g., obtained from soybean, etc.) and heme (e.g., heme obtained from animal blood or heme obtained from soy plant, etc.) to form a calcium-enriched meat (e.g., beef) substitute (e.g., vegan meat or tofu, etc.). More specifically, edible aragonite may be combined with a non-animal protein substitute and alginate in a 3D form to culture/grow a non-animal protein "beef" composition.

In some embodiments, restructured calcium carbonate can be used as exfoliating, polishing, or grinding materials (e.g., a toothpaste, a whitening reagent, a cleaning material, dish soap, pet chew toys, etc.). Preferably, the restructured calcium carbonate may be combined or mixed with graphene (in 10:1 ratio, 20:1 ratio, 30:1 ratio) to increase the firmness or stiffness of the composite containing the restructured calcium carbonate.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. Where the specification or claims refer to "at least one" of something selected from the group consisting of A, B, C . . . and N, the text should be interpreted as requiring only one element from the group, not A plus N, or B plus N, etc.

What is claimed is:

1. A pavement composition comprising:
   a bituminous conglomerate,
   graphene, and
   aragonite, and
   a surfactant in an amount effective to increase interfacial stability.

2. The pavement composition of claim 1, wherein the bituminous conglomerate comprises thermoplastic polymer, a polymeric compound selected from the group consisting of polyvinylbutyral (PVB), polyethylacrylate (PEA) polymethylacrylate (PMA), polybutylacrilate (PBA), and lignin.

3. The pavement composition of claim 1, further comprising aggregate and/or reclaimed asphalt pavement.

4. The pavement composition of claim 1, wherein the aragonite comprises a plurality of restructured calcium carbonate particles having an average diameter less than or equal to 10 µm.

5. The pavement composition of claim 4, wherein the average particle diameter is between 100 nm and 10 µm.

6. The pavement composition of claim 4, wherein at least half of the plurality of restructured calcium carbonate particles have a diameter between 100 nm and 10 µm.

7. The pavement composition of claim 1, wherein the aragonite is between 0.0005% to 5% of the total weight of the composition.

8. The pavement composition of claim 1, wherein the aragonite is derived from a portion of a marine animal.

9. The pavement composition of claim 1, wherein the graphene is between 0.0005% to 1% of the total weight of the composition.

10. The pavement composition of claim 1, wherein the graphene is recycled graphene.

11. The pavement composition of claim 1, wherein the graphene comprises graphene nanoplatelets.

12. The pavement composition of claim 1, wherein the surfactant is between 0.0005% to 2% of the total weight of the composition.

13. The pavement composition of claim 1, wherein the bituminous conglomerate is selected from the group consisting of: naturally occurring bitumen, bitumen derived from crude oil, petroleum pitch obtained from a cracking process, coal tar, polymer-modified bitumen, rubberized bitumen, rubberized bitumen containing recycled tire material, acid-modified bitumen, wax-modified bitumen, and combinations thereof.

14. The pavement composition of claim 1, wherein the pavement composition has an ignition temperature of at least 1000° C.

15. The pavement composition of claim 1, wherein the pavement composition has a tensile strength greater than a pavement composition made with the bituminous conglomerate without the graphene and/or aragonite.

16. The pavement composition of claim 1, wherein (1) the pavement composition has greater rutting resistance than a pavement composition made with the bituminous conglomerate without the graphene and/or aragonite, (2) the pavement composition has greater fatigue resistance than a pavement composition made with the bituminous conglomerate without the graphene and/or aragonite, and/or (3) wherein the pavement composition has greater stiffness as measured by the Stiffness Modulus than a pavement composition made with the bituminous conglomerate without the graphene and/or aragonite.

* * * * *